Oct. 21, 1969   L. R. TRAVIS   3,474,188
TAKE-UP MECHANISM FOR FLAT ELECTRICAL CABLE
Filed Nov. 16, 1967
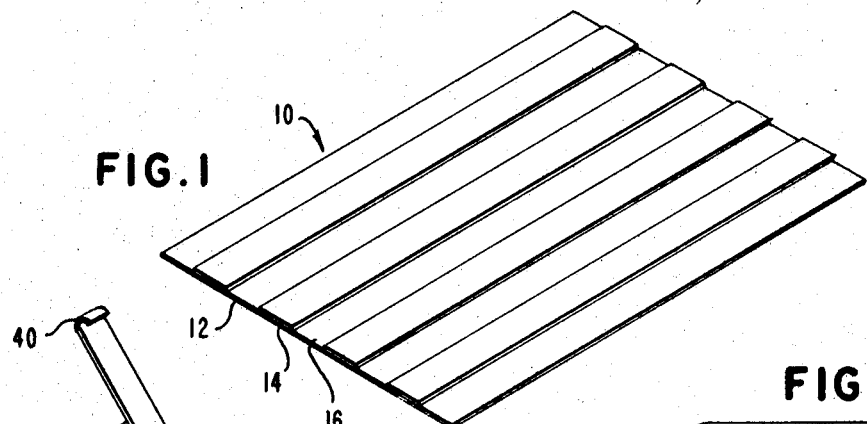
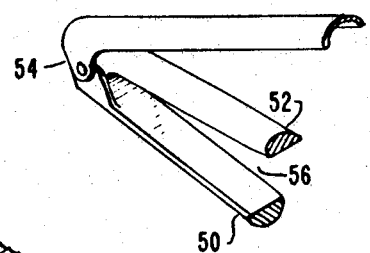
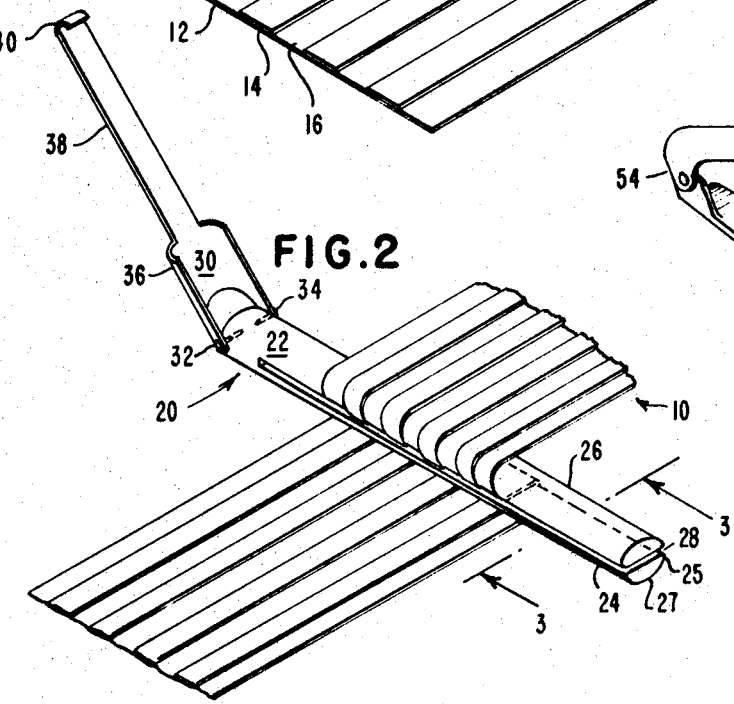
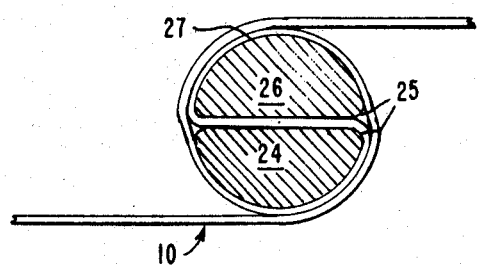
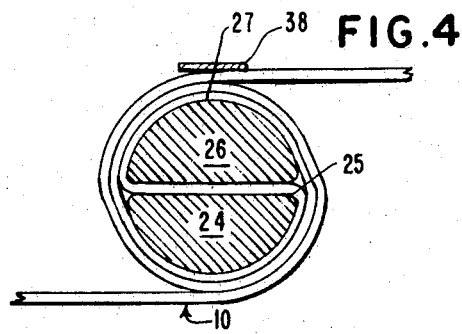
LAWRENCE R. TRAVIS
INVENTOR.
BY McLean, Morton and Boustead
ATTORNEYS

United States Patent Office 3,474,188
Patented Oct. 21, 1969

3,474,188
TAKE-UP MECHANISM FOR FLAT ELECTRICAL CABLE
Lawrence R. Travis, Brockton, Mass., assignor to Electro Connective Systems, Inc., Brockton, Mass., a corporation of Massachusetts
Filed Nov. 16, 1967, Ser. No. 683,562
Int. Cl. H01b 7/00, 11/02
U.S. Cl. 174—135                                                                        10 Claims

ABSTRACT OF THE DISCLOSURE

An apparatus for shortening the length between ends of a flat, flexible electrical cable is shown. The apparatus includes a pair of parallel arms between which a flat cable passes and about which cable is wound and a locking member attached to an arm which locks cable in a wound position by firmly pressing it against the winding arm. The locking member is preferably rotatably mounted on an arm and useful in a rotated position as a lever arm to wind cable.

---

This invention relates to an apparatus for shortening the distances between ends of a flat, flexible electrical cable and more specifically to a take-up mechanism upon which cable can be conveniently wound and stored. Even more specifically it relates to a pair of winding arms about which a thin flat conductor, for example, lines of conductive foil encapsulated in a flexible dielectric web, can be wound in order to shorten the end to end distance of a length thereof.

Flat conductors including among other things printed cables and ribbon cables are rapidly gaining acceptance in a variety of electronic and electrical applications. Flat webs of flexible dielectric material in which a plurality of lines of conductive foil is encapsulated are useful as connections between terminals where economy of space is desirable. These flexible webs are made by a variety of techniques including bonding a foil of conductive material to a flexible dielectric polymeric base, selectively etching portions of the conductive foil not desired as circuit paths and encapsulating the base and relieved circuit paths with a suitable protective overlayer. In many applications the terminals to be connected by a printed cable are movable relative to one another in response to mechanical or thermal influences and connecting cable must be at least as long as the maximum distance between terminals. When the terminals are closer together than this maximum separation, the cable is slack and sagging or bunching up occurs in the space between the terminals. The result is inefficient use of space, unsatisfactory appearance and possibly inferior electrical performance. In other applications it is more economical to produce cable in standard lengths, and where the distance between terminals is between standard lengths, the above-described problems also occur.

The prior art has suggested several techniques to maintain a relatively taut connection between terminals and yet provide for expansion and contraction of the cable. One arrangement includes an accordion type pleat in the cable. Another includes large, expensive rewind units which are space consuming and often cause electrical side effects deleterious to the overall system. Still a third is that suggested by U.S. Patent No. 3,300,572 to Dahlgren et al. wherein cable having a plastic memory is coiled and set in a reverse wound configuration from which cable may be released and retracted. None of the foregoing techniques is completely satisfactory for a variety of reasons and the art is faced with the need to provide a better arrangement for solving the problem of fixed cable lengths and movable terminal connections.

It is therefore an object of this invention to provide an apparatus for "taking up" excess cable in an orderly and economical fashion and releasing cable as it is needed.

It is a further object of this invention to provide an apparatus which is not space consuming and can hold excess cable in a neat, compact configuration.

It is a further object of this invention to provide a locking mechanism with the apparatus which maintains the cable in a fixed retracted state.

These and additional objects are achieved by an apparatus including: two winding arms each at least as long as the width of the electrical cable to be "taken-up," spaced from one another to define a zone into which flat cable can pass; means connecting the arms and fixing them relative to one another but not interfering with cable in the zone defined between the arms; means to rotate the connected arms about an axis parallel to the width of the cable and intermediate the arms, whereby cable is wrapped and unwrapped about the arms and the distances between the ends of a length of cable are shortened and lengthened; and a locking member associated with an arm having an unlocked position not interfering with said cable and a locking position in which the locking member abuts wound cable snugly holding it against an arm of the apparatus.

The locking member is preferably hinged or pinned to a winding arm so that it can be rotated free of the winding arms when they are rotated to take up or let out cable. When in position, the locking member abuts against the outside of cable wound around the winding arms and presses it firmly against the underlying winding arm, thereby precluding any relative motion of cable and arm and thus preventing unwinding or loosening of the wound cable. When additional cable is required, the locking member is released and the arms are reverse rotated to unwind the desired amount of cable. In a preferred embodiment described more fully in the accompanying drawing, the locking member serves a dual function. In its unlocked position, it is rotated to a position at right angles to the axis of rotation of the winding arms and serves as a lever-handle to facilitate taking up or letting out of cable. In its locked position it lies parallel with a winding arm outside of wound cable and engages an end of a winding arm, thereby holding the cable firmly against the underlying winding arm.

In the drawings:

FIG. 1 is a view of flat, flexible electrical cable which is wound on the apparatus of the invention;

FIG. 2 is a view of a preferred embodiment of the apparatus of this invention upon which cable is partially wound;

FIG. 3 is a view taken along lines 3—3 of FIG. 2;

FIG. 4 is also a view along lines 3—3 of FIG. 2 but showing in addition the locking feature of the apparatus; and FIG. 5 is a preferred take-up mechanism having winding arms which are pivotable relative to one another.

In FIG. 1 reference numeral 10 refers generally to a flat, flexible electrical cable. Reference numeral 12 refers to a flat, flexible backing material such as a polyamide-polyimide which has good dielectric properties as well as good dimensional stability. Reference numeral 14 refers to a flat length of a conductive foil such as copper, and reference numeral 16 refers to an overlayer of encapsulating material such as polyester film. The cable 10 is manufactured by bonding a layer of copper foil to the backing material, masking positions of the foil with an etchant resistant material and etching the entire foil to remove unmarked portions thereof. The backing and relieved circuit paths are then encapsulated by laminating with polyester film using fluorinated ethylene propylene polymer as adhesive.

In FIG. 2 reference numeral 20 refers to the "wind-up" apparatus of the invention. It includes a base portion 22 from which two parallel winding arms 24 and 26 extend. These arms are spaced to provide zone 28 between them through which cable 10 can pass. Winding arms 24 and 26 have rounded edges 25 and surfaces 27 to prevent creasing of cable 10. A locking member 30 is rotatably attached to base 22 by means of pins 32 and 34 and is free to rotate in a plane perpendicular to the length of cable 10. Locking member 30 has an inward portion 36 which mates with the top part of base 22 and winding arm 26 and an outward portion 38 having a more flexible characteristic suitable to overlie cable wound on arm 26 and firmly press it against arm 26 to prevent unwinding of the cable. Locking member 30 has at its outwardmost extension a clip 40 which engages the outermost portion of arm 26 when in its locked position. Locking arm 38 in the position shown is at right angles to winding arms 24 and 26 and it may be rotated in the direction of the arrow to wind cable 10 about those arms.

In FIG. 3 the cable 10 is shown partially wound about arms 24 and 26, and in FIG. 4 the cable is shown locked in a wound position by locking arm 30, more specifically outward portion 38.

In FIG. 5 the take-up mechanism has winding arms 50 and 52 which are pivotable with respect to one another about a common axle-pin 54. The zone 56 between arms 50 and 52 can be thusly expanded to facilitate locating a flat cable in position for take-up. In other respects the apparatus of FIG. 5 is not different from that of FIG. 2.

Other arrangements of the present invention are possible. For example, locking member 30 can be mounted on base 22 so as to rotate in a plane parallel to that of cable 10 or other pivotal, or rotating arrangements can be provided.

What is claimed is:

1. The combination of a length of flexible flat electrical cable and an apparatus for adjusting the distance between the two ends of cable, said apparatus including two winding arms each at least as long as the width of said cable spaced from one another to define a zone into which said cable passes; means connecting said arms and fixing them relative to one another, said means not interfering with cable in the zone defined between said arms; means to rotate the connected arms about an axis parallel to the width of the cable and intermediate said arms, whereby said cable can be wrapped and unwrapped about the arms and the distance between the ends thereof shortened and lengthened; and a locking member associated with an arm having an unlocked position not interfering with said cable and a locking position in which said locking member abuts said cable firmly holding it against an arm of the apparatus.

2. The apparatus of claim 1 wherein the spacing between said winding arms is slightly larger than the thickness of said flat cable.

3. The apparatus of claim 1 wherein said means to rotate said winding arms is a locking member rotatably mounted on a said arm, said member having a rotated position at right angles to the rotational axis of said arms in which it is used as a lever-handle to rotate said arms and a position parallel with a said arm in which it is used to lock wound cable against a said arm.

4. The apparatus of claim 3 wherein said locking member is hinged to one end of a said winding arm, is rotatable in a plane perpendicular to the length of said cable and has locking means adapted to engage mating means in an opposite end of a said winding arm.

5. The combination of a length of flexible flat electrical cable and an apparatus for adjusting the distance between the two ends of cable, said apparatus including a base; two spaced parallel winding arms extending from said base, each arm being at least as long as the width of said electrical cable and the spacing of said arms being slightly greater than the thickness of said flat cable, said cable being passed into said spacing; and a locking member rotatably mounted on said base and rotatable to a position wherein it can be used as a lever-arm for rotating said winding arms about an axis parallel with the width of said cable and intermediate said arms and rotatable to a position in which it abuts against cable wound on said winding arms holding said cable firmly against a said winding arm.

6. The apparatus of claim 5 wherein said locking member is a third arm at least as long as the width of said cable, said arm being hinged to said base and rotatable in the plane perpendicular to the length of said cable.

7. The apparatus of claim 6 wherein said locking arm has locking means adapted to engage mating locking means in an extension of a said winding arm away from said base and lie snugly against wound cable overlying said winding arm thereby locking said cable in a fixed position against said winding arm and preventing unwinding of said cable.

8. The apparatus of claim 7 wherein said locking means includes a clip at the end of said locking arm which fastens to the end of said winding arm.

9. The apparatus of claim 5 wherein said winding arms have rounded edges to prevent cutting the cable wound around said arms.

10. The apparatus of claim 5 wherein said base includes an axle pin and said winding arms are pivotably mounted on said axle pin.

References Cited

UNITED STATES PATENTS

| | | | |
|---|---|---|---|
| 1,467,420 | 9/1923 | Breer | 24—71.2 |
| 1,636,457 | 7/1927 | Brinkschneider | 132—33 |
| 2,200,590 | 5/1940 | Black | 132—33 |
| 2,277,798 | 3/1942 | Sylow-Hansen | 132—33 |
| 2,288,446 | 6/1942 | Gemerchak | 132—33 |
| 2,318,972 | 5/1943 | Simas | 132—33 |
| 2,927,953 | 3/1960 | Staller | 174—69 |
| 2,991,523 | 7/1961 | Del Conte | 24—71.2 |
| 3,300,572 | 1/1967 | Dahlgreen et al. | 174—69 |

LEWIS H. MYERS, Primary Examiner

A. T. GRIMLEY, Assistant Examiner

U.S. Cl. X.R.

174—117; 242—75.3